May 17, 1927.
J. J. CALLAHAN ET AL
1,628,821
METHOD OF MAKING HOLLOW ANNULAR ARTICLES
Filed Oct. 25, 1923
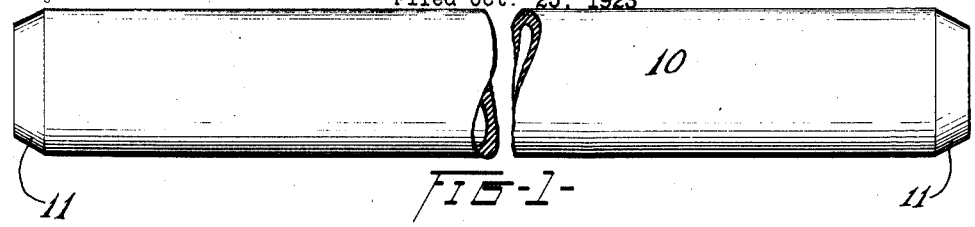
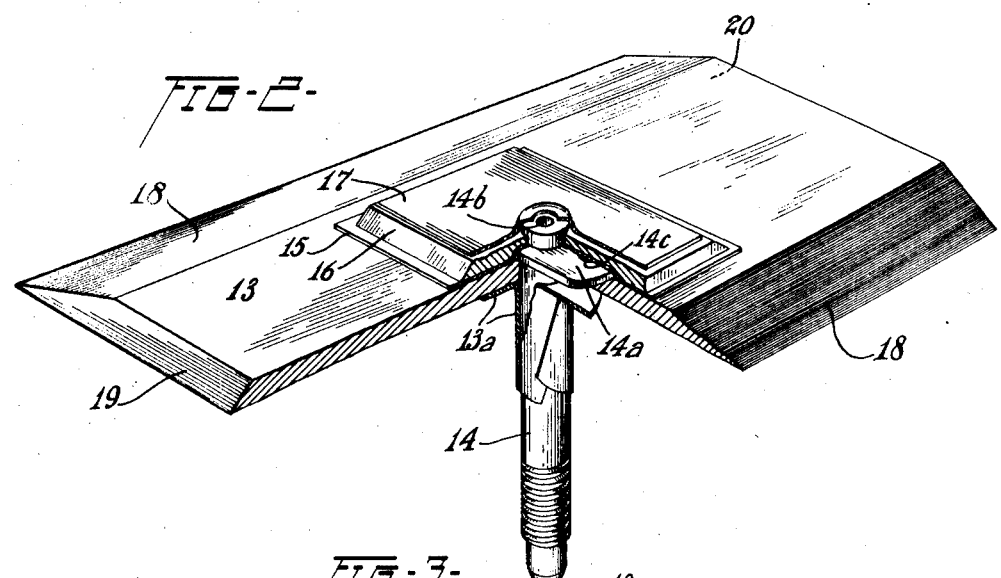
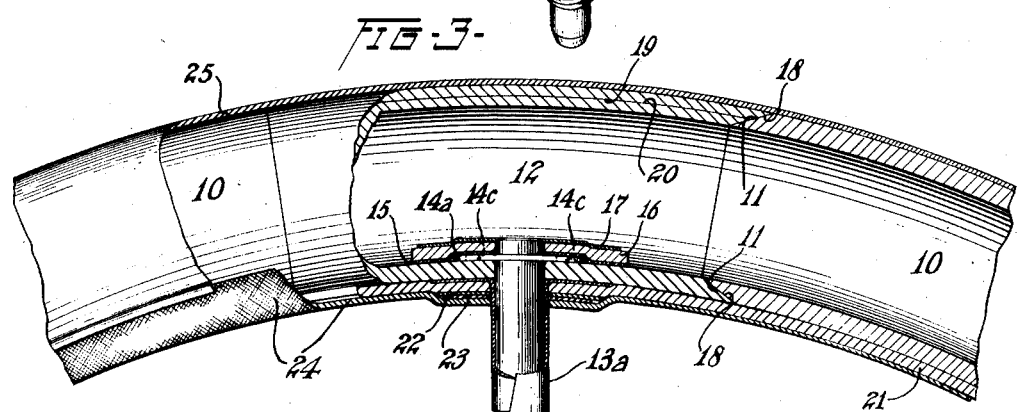
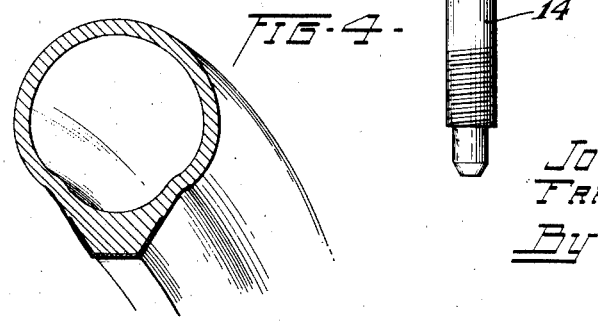
Inventors,
John J. Callahan and
Francis C. Rogers.
By Robert M. Pierson
Atty Patented May 17, 1927.

1,628,821

UNITED STATES PATENT OFFICE.

JOHN J. CALLAHAN AND FRANCIS C. ROGERS, OF AKRON, OHIO, ASSIGNORS TO THE B. F. GOODRICH COMPANY, OF NEW YORK, N. Y., A CORPORATION OF NEW YORK.

METHOD OF MAKING HOLLOW ANNULAR ARTICLES.

Application filed October 25, 1923. Serial No. 670,760.

This invention relates to the art of manufacturing hollow articles having an insert such as a valve-stem mounted in the wall thereof, and more particularly hollow, annular articles such as the expansible air or water bags of reinforced rubber construction upon which certain types of pneumatic tires are vulcanized.

Prior to our invention, a common method of manufacturing expansible cores of this description was to form a straight, tubular structure of unvulcanized rubber, externally skive or bevel both its ends, punch a valve-stem hole through its wall at a distance from one end, mount a valve-stem therein, splice the respective ends of the tube, by stretching one end and telescoping it over the other, to form an annular structure, finish the building of the core, and then vulcanize the resulting hollow, annular structure. The base of the valve-stem requires to be firmly imbedded in the wall of the tube to prevent leakage, and the mounting thereof was a difficult matter, and the type of valve-stem was limited, because of the restricted working space within the interior of the tube, and because it was necessary to insert the valve-stem into its aperture from the inside of the tube. Moreover, both of the tube ends being externally beveled, because of the impracticability of beveling one of them internally. the splicing of the tube required considerable muscular strength to stretch one of the externally skived tube ends over the other. These defects in methods heretofore employed have resulted in imperfections in the product, as well as making the construction of the cores a difficult and expensive operation.

Our general objects are to provide an improved expansible core or similar article and an improved method whereby such articles, of good quality, may be manufactured easily and economically. More specific objects are to facilitate the building of the valve-stem into the tube, to provide improved seams or splices in the latter, and to provide an improved anchorage and sealing of the valve-stem base. A further object is to provide a method permitting the use of valve-stems of different types than have been found expedient in methods heretofore employed.

Of the accompanying drawings:

Fig. 1 is an elevation of the externally skived or beveled end portions of an unvulcanized rubber tube as prepared in accordance with a preferred form of our invention.

Fig. 2 is a perspective view, on a large scale, parts being broken away and in section, of a valve-stem and associated parts prior to their assembly with the tube shown in Fig. 1.

Fig. 3 is a longitudinal section, with parts in elevation, of a portion of a core embodying and assembled in accordance with our invention, as it appears prior to vulcanization.

Fig. 4 is a sectional, perspective view of a part of the same as it appears after vulcanization.

Briefly, our invention comprises forming a relatively short tubular section of stock with the valve stem incorporated therein, and then joining its ends to the respective ends of a relatively long, tubular length of stock to form an annular tubular structure. The short inset section or tubular length preferably is originally formed as a flat piece of stock, permitting economical preparation thereof and unrestricted working space for mounting the valve-stem therein, said section then being flexed to tubular form and its contacting margins joined. We do not wholly limit ourselves to this mode of construction, however, as the inset section alternatively may be formed by molding it as a short tubular section, the valve-stem being incorporated therein in the molding thereof.

Referring to the drawings, 10 is a tube of unvulcanized rubber, having its respective ends externally beveled or skived as at 11, 11, said tube being of sufficient length to form, when arcuately bent, the major segment of an annular, expansible core, the annulus being completed by a relatively short tubular segment 12 (Fig. 3) interposed between the ends of the tube 10 and spliced thereto.

The preferred method of assembling the segment 12 is shown in Fig. 2. Said segment, at the stage of its preparation there shown comprises a quadrilateral, flat slab or sheet 13 of unvulcanized rubber of the same thickness as the wall of the tube 10, a valve stem 14 inserted in a central aperture therein and having an integral, rectangular flange 14ª adjacent its inner end overlying and pressed upon said slab, the flange 14ª preferably being formed with apertures 14ᶜ and the base portions of the valve stem being cemented to obtain good anchorage and sealing of the valve stem in the rubber. A relatively thin, soft, rectangular piece of unvulcanized rubber 15, is mounted upon the inner end of the valve stem, flange 14ª and adjacent portions of the slabs 13, a relatively thick piece of unvulcanized rubber 16 is placed over the piece 15, and a thin piece of unvulcanized rubber 17 is laid over the piece 16 and part of the inner end of the valve stem 14, said piece being formed with a central opening which leaves exposed the aperture 14ᵇ of the valve stem. A piece of thin sheet rubber 13ª is wrapped around the valve stem 14 on the opposite side of the slab 13, with its margin projecting laterally and lying against the face of the slab 13 about the base of the valve stem 14.

The aforesaid parts, being assembled as shown, are all pressed firmly together into adhesive engagement with each other, this being a simple and easy matter with the sheet 13 in flat condition. The rubber pieces 15 and 17, being relatively thin and soft, are easily pressed around the corners of the valve-stem 14 and into intimate contact with its surface, thus insuring that the finished core will be fluid-tight around said stem.

Opposite margins of the sheet 13 are both outwardly skived from its "inner" face, preferably before assembling it with the associated parts as above described, such skiving providing beveled faces 18, 18, and its alternate margins are beveled from opposite faces of the slab, providing beveled end faces 19, 20 which, in the particular form of slab here shown, are parallel when the slab is flat, so that when the slab is bent into tubular form and the faces 19, 20 are brought together they may be abutted and joined in full face to face contact to form a bevel seam, and the faces 18 afford an internal bevel at each end of the short, tubular structure, adapted to fit over the beveled ends 11 of the tube 10, as shown in Fig. 3.

In assembling the core, the tube 10 being prepared as shown in Fig. 1 and the insert assembly being prepared as shown in Fig. 2, the latter is flexed to tubular form, and the faces 19 and 20 are joined and rolled or stitched in a lapped, bevel seam, to form the segment 12 (Fig. 3), with the valve stem mounted therein. The tube 10 is bent to arcuate form and its externally beveled ends 11 are inserted in the respective internally beveled ends 18 of the tubular segment 12, as shown in Fig. 3, and the beveled faces 18 and 11 are joined in annular, lapped seams, as by flattening the joint and rolling or "stitching" the overlapped, beveled margins, the interior of the segment 12 and of the tube 10 being soapstoned to prevent adhesion of their inner walls to each other.

The building of the core may then be finished by applying a relatively thick strip 21 of unvulcanized rubber to the inner periphery of the hollow, annular structure, applying rubberized fabric reinforcement patches 22, 23, of graduated size, around the valve stem 14, applying a rubberized fabric strip 24 to the inner periphery of the tube, against the rubber strip 21, and then inflating the tube and applying a surface layer 25 of slow-cure or non-vulcanizing rubber compound, adapted to delay over-cure of the surface of the core in use, to all of the tube not covered by the fabric strip 24. The tube is then vulcanized in a mold, under internal fluid pressure, whereby it is given its final shape, the completed core appearing as shown in Fig. 4, the molding and vulcanizing of the assembly firmly compacting and uniting its several parts in a unitary structure.

Our invention not only facilitates the manufacture of the core, but provides a finished product of superior quality, and especially in that the valve stem is more accurately positioned, firmly embedded and securely sealed than in cores heretofore made.

Modifications may be resorted to without departing from the scope of our invention, and we do not wholly limit our claims to the specific construction shown or to the exact procedure described.

We claim:

1. The method of inserting a fluid-passage member into the wall of a tubular, annular, rubber article which comprises forming a short tubular structure, building thereinto a fluid-passage member during such formation, forming a relatively long tubular structure, and connecting the ends of the latter structure to form a tubular annulus by inserting between and joining to said ends the short tubular structure.

2. The method of building a fluid-passage member into a wall of an annular, rubber tube which comprises building the fluid passage member into rubber stock formed to constitute a short segment of the tube, forming a tubular length of stock to constitute a major segment of the tube, and constructing from the two segments an annular tube.

3. The method of mounting a fluid-passage member in a wall of a tubular annulus which comprises building the fluid-passage member into rubber stock formed to constitute a short segment of the tube having annular beveled edges, forming a tubular length of stock having ends beveled to fit the beveled edges of the short segment, and uniting the cooperating edges of said segments to form a tubular annulus.

4. The method of making an annular, tubular article of rubber having a fluid-passage member mounted in a wall thereof which comprises forming a tubular length of stock, forming a relatively small, flat sheet of stock, mounting said fluid-passage member in said sheet, flexing said sheet to tubular form, joining its margins which are thereby presented to each other, and joining the ends of the tubular structure thus formed with the respective ends of the aforesaid tubular length of stock.

5. The method of making an annular, tubular rubber article having a fluid-passage member mounted in a wall thereof which comprises forming a tubular length of stock with externally beveled ends, forming a relatively small, flat sheet of stock, mounting said fluid-passage member in said sheet, beveling opposite margins of said sheet outwardly from the face thereof destined to be its inner face when it is flexed to form a tubular structure, so that said structure will have internally beveled ends, so flexing said sheet and joining the margins thereof which are thereby presented to each other, and joining the ends of the tubular structure thus formed with the respective ends of the aforesaid tubular length of stock.

6. The method of making an annular, rubber, vulcanizing core which comprises forming a substantially straight, tubular length of stock with externally beveled ends, forming a flat, quadrilateral sheet of stock, mounting a fluid-passage stem in said sheet, beveling opposite margins of said sheet outwardly from the face thereof destined to be its inner face when it is flexed to form a tubular structure, so that said structure will have internally beveled ends, so beveling the alternate margins of said sheet that they may be brought together in a beveled seam when the sheet is so flexed, so flexing said sheet and joining said alternate margins to form a tubular structure having said fluid-passage stem mounted in a wall thereof, and joining the ends of said structure with the respective ends of the aforesaid tubular length of stock, in annular beveled seams.

In witness whereof we have hereunto set our hands this 23rd day of October, 1923.

FRANCIS C. ROGERS.
JOHN J. CALLAHAN.